United States Patent [19]

Last

[11] Patent Number: 5,398,999
[45] Date of Patent: Mar. 21, 1995

[54] VEHICLE BRAKE ASSEMBLY AND METHOD OF INSTALLATION

[75] Inventor: Larry L. Last, Northville, Mich.

[73] Assignee: Kelsey-Hayes Company, Romulus, Mich.

[21] Appl. No.: 24,982

[22] Filed: Mar. 1, 1993

[51] Int. Cl.⁶ .............................................. B23P 11/02
[52] U.S. Cl. .................................. 301/6.1; 301/105.1; 188/106 A
[58] Field of Search ............... 301/6.1, 6.6, 6.8, 105.1; 188/106 A, 361, 362; 29/469

[56] References Cited

U.S. PATENT DOCUMENTS

| | | | |
|---|---|---|---|
| 2,267,225 | 12/1941 | Weeks et al. | 301/6.6 X |
| 2,914,142 | 11/1959 | Klaue | 188/106 A X |
| 4,219,923 | 9/1980 | Marti | 29/469 X |
| 5,205,025 | 4/1993 | Kielwein et al. | 29/469 X |

*Primary Examiner*—Russell D. Stormer
*Attorney, Agent, or Firm*—MacMillan, Sobanski & Todd

[57] ABSTRACT

A method of installing a vehicle spindle and brake assembly on a vehicle component. First, the spindle and brake assembly are "preassembled" into a complete brake unit. The preassembled spindle and brake assembly includes a spindle, a rotatable component, a bearing member for supporting the rotatable component relative to the spindle, and a brake mounting plate secured to the spindle and adapted to support brake friction pads. The preassembled spindle and brake assembly further includes a plurality of inwardly extending vehicle mounting lugs carried by the spindle, and a plurality of outwardly extending wheel mounting lugs carried by the rotatable component. Next, the preassembled spindle and brake assembly is positioned on a vehicle component such that the vehicle mounting lugs extend through a plurality of corresponding lug receiving apertures formed in the vehicle component. The preassembled spindle and brake assembly can then be secured relative to the vehicle component. In order to accomplish this method, an improved spindle and brake assembly is needed, wherein the plurality of vehicle mounting lugs are secured relative to the spindle prior to installing the preassembled spindle and brake assembly on the vehicle component.

3 Claims, 6 Drawing Sheets

VEHICLE BRAKE ASSEMBLY AND METHOD OF INSTALLATION

BACKGROUND OF THE INVENTION

This invention relates to an improved vehicle brake assembly, including both drum and disc type brakes, for use with non-driven vehicle wheels, and to a method of installing the assembly on an associated vehicle.

Generally, the brake assemblies for the non-driven wheels of a four wheel vehicle (e.g., the rear wheels on a front drive vehicle), incorporate a spindle and bearing means for rotatably supporting a hub and either a brake drum or disc. The brake, spindle, bearing means, and hub are secured to an unsprung vehicle component, such as one end of an axle tube, in various manners, depending upon the particular type of brake assembly.

One example of such a prior art drum brake assembly is illustrated in FIG. 1, and is indicated generally at 10. As shown therein, the drum brake assembly 10 includes a generally axially extending spindle or stub axle 12, a brake subassembly 13 including a backing plate 14, and a brake drum 16. The brake drum 16 includes an integrally cast hub 18, and a plurality of wheel mounting lugs 20 press-fit or otherwise secured in apertures formed in the brake drum 16.

The brake subassembly 13 further includes a pair of arcuate brake shoes, only one shoe 22 being shown, and other related brake components, such as disclosed in U.S. Pat. No. 5,070,968 to Evans, and herein incorporated by reference. The subassembly 13 is usually provided by the brake manufacturer. Typically, one of the brake components is a parking brake cable 24 extending from the backing plate 14 and operatively connected to actuate a parking and emergency brake mechanism (not shown). In some instances, the cable 24 is not part of the subassembly 13 but is connected to the parking and emergency brake mechanism after the brake assembly 10 has been assembled and secured to the vehicle.

In order to assemble and secure the brake assembly 10 to a vehicle component, such as an axle flange 26, the spindle 12 in inserted through a central opening formed in the backing plate 14 until a outboard side 28 of a vehicle mounting flange 30 of the spindle 12 engages an inboard side 32 of the backing plate 14. Next, a plurality of threaded hex head bolts 34 (only two of which are shown), are inserted through corresponding apertures formed in the backing plate 14 and the vehicle mounting flange 30 of the spindle 12. Nuts 36 are installed on the bolts 34 and tightened to secure the spindle 12 and the brake subassembly 13 to the axle flange 26.

Next, a grease seal 38 and an inner tapered roller bearing 40 are installed on the spindle 12. The brake drum 16 is placed over the backing plate 14 so that a threaded end 42 of the spindle 12 extends axially outwardly through the hub 18 of the brake drum 16. Next, an outer tapered roller bearing 44, a keyed washer 46, and a nut 48 are installed on the spindle 12. The nut 48 is tightened to predetermined specifications to properly load the bearings 40 and 44.

A nut retainer 50 is then inserted over the spindle end 40 and about the nut 48, and a cotter pin 52 is installed through a slot 54 formed in the nut 50, and through an aperture 56 formed in the spindle end 42. The nut retainer 50 and cotter pin 52 cooperate to prevent the nut 48 from loosening during operation of the vehicle. Finally, a generally dome-shaped protective cover 58 is press-fit onto the end of the hub 18 to prevent dirt and other debris from entering the brake assembly 10.

Another example of a prior art drum brake assembly is illustrated in FIG. 2, and is indicated generally at 60. As shown therein, the drum brake assembly 60 includes a brake subassembly 61 including a backing plate 62, a hub and bearing unit 64, and a brake drum 66. The hub and bearing unit 64 includes a vehicle mounting flange 68, a wheel mounting flange 70, and a spindle 72. A plurality of wheel mounting lugs 74 are press-fit into apertures formed in the wheel mounting flange 70, and the vehicle mounting flange 68 is provided with a plurality of threaded apertures (not shown). The brake subassembly 61 includes a pair of arcuate brake shoes, only one shoe 76 being shown, and other related brake components which are usually provided by the brake manufacturer.

In order to assemble and secure the brake assembly 60 to an axle flange 78 of a vehicle, the backing plate 62 and the hub and bearing unit 64 are positioned adjacent one another so that threaded apertures formed in the vehicle mounting flange 70 are aligned with apertures formed in the backing plate 62. Next, an inboard side 80 of the backing plate 62 is positioned adjacent the axle flange 78, and a plurality of hex head bolts 82 (only two of which are shown), are installed through apertures formed in the axle flange 78 and the backing plate 62, and are threadably received in the threaded apertures of the vehicle mounting flange 68. Tightening of the bolts 82 secures the brake subassembly 61 and the hub and bearing unit 64 to the axle flange 78.

The brake drum 66 is then placed over the brake subassembly 61 so that the lugs 74 extend through corresponding apertures formed in the drum 66. Finally, seating-lock type fasteners 84 are installed on the lugs 74 to secure the brake drum 66 to the backing plate 62, and therefore, to the axle flange 78. In some instances, the lugs 74 are press-fit into the drum 66, thus eliminating the need for the fasteners 84.

An example of a prior art disc brake assembly is illustrated in FIG. 3, and is indicated generally at 90. As shown therein, the disc brake assembly 90 includes a drum-in-hat parking brake. The brake assembly 90 further includes a spindle 92, a brake support casting 94, a hub 96, and a hat-shaped rotor 98. The brake support casting 92 includes a vehicle mounting flange 100 and a backing plate 102. A pair of arcuate brake shoes, only one shoe 104 being shown, and other related brake components, such as disclosed in U.S. Pat. No. 4,854,423 to Evans et al., and herein incorporated by reference, are usually provided by the brake manufacturer. The hub 96 includes a wheel mounting flange 104 having a plurality of wheel mounting lugs 106 press-fit into apertures formed therein.

In order to assemble and secure the brake assembly 90 to a fixed part of a vehicle, such as an axle flange 108, the spindle 92 is inserted through an aperture formed in the casting 94 until an outboard side 110 of a vehicle mounting flange 112 of the spindle 92 engages an inboard side 114 of the mounting flange 100. Next, a plurality of threaded hex head bolts 116 (only two of which are shown), are inserted through corresponding apertures formed in the flange 100 of the casting 94 and the flange 112 of the spindle 92. Nuts 118 are installed on the bolts 116 and tightened to secure the brake support casting 94 and the spindle 92 to the axle flange 110.

Next, an inner tapered roller bearing 120, the hub 96, an outer tapered roller bearing 122, a keyed washer 124, and a nut 126 are installed on the spindle 92 so that a threaded end 128 of the spindle 92 extends axially outwardly through the hub 96. The nut 126 is tightened to pre-load the bearings 120 and, 122. A nut retainer 130 is inserted over the spindle end 128 and about the nut 126, and a cotter pin 132 is installed through a slot 134 formed in the nut retainer 130, and through an aperture 136 formed in the spindle end 128. A generally dome-shaped protective cover 138 is press-fit onto the end of the hub 96.

The rotor 98 of the disc brake is then placed over the hub 96 so that the lugs 106 extend through corresponding apertures formed in the rotor 98. Finally, a disc brake caliper 140 is supported on the support casting 94 via a pair of guide rails, only one guide rail 142 being shown, and secured thereon by bolts 144.

In all of the above-described prior art brake assemblies, the individual brake components can be installed only after the spindle and the brake subassembly or the support casting are secured to the vehicle. Also, a shortage of any part of the brake assembly may affect the assembling and installing of the assembly on the vehicle, or may even require shutting down of the assembly line.

SUMMARY OF THE INVENTION

The present invention concerns a method of installing a vehicle spindle and brake assembly on a vehicle component. In accordance with this method, the spindle and brake assembly are first "preassembled" into a complete brake unit. In particular, the preassembled spindle and brake assembly includes a spindle, a rotatable component, bearing means for supporting the rotatable component relative to the spindle, and a brake mounting plate secured to the spindle and adapted to support brake friction pads. The preassembled spindle and brake assembly further includes a plurality of inwardly extending vehicle mounting lugs carried by the spindle, and a plurality of outwardly extending wheel mounting lugs carried by the rotatable component. In the preferred embodiment, the preassembled spindle and brake assembly includes friction pads supported relative to the spindle, and the rotatable component includes an annular surface engageable by the friction pads. Next, the preassembled spindle and brake assembly is positioned on a vehicle component such that the vehicle mounting lugs extend through a plurality of corresponding lug receiving apertures formed in the vehicle component. The preassembled spindle and brake assembly can then be secured relative to the vehicle component.

In order to accomplish this method, it has been found necessary to provide an improved vehicle spindle and brake assembly. In particular, the improved assembly includes means for securing the plurality of vehicle mounting lugs relative to the spindle prior to installing the preassembled spindle and brake assembly on the vehicle component. This retains the vehicle mounting lugs until they can be secured to the vehicle.

Such a method allows the brake assembly to be completely "preassembled" at one location (e.g., by the brake manufacturer), and then shipped to an axle or vehicle assembly plant for subsequent installation on a vehicle. As a result of this, inventory space at the assembly plant can be reduced. Also, the time required to install the preassembled brake assembly on a vehicle is reduced.

Other advantages of this invention will become apparent to those skilled in the art from the following detailed description of the preferred embodiment, when read in light of the accompanying drawing.

DETAILED DESCRIPTION OF THE PREFERRED EMBODIMENT

Figure 1:
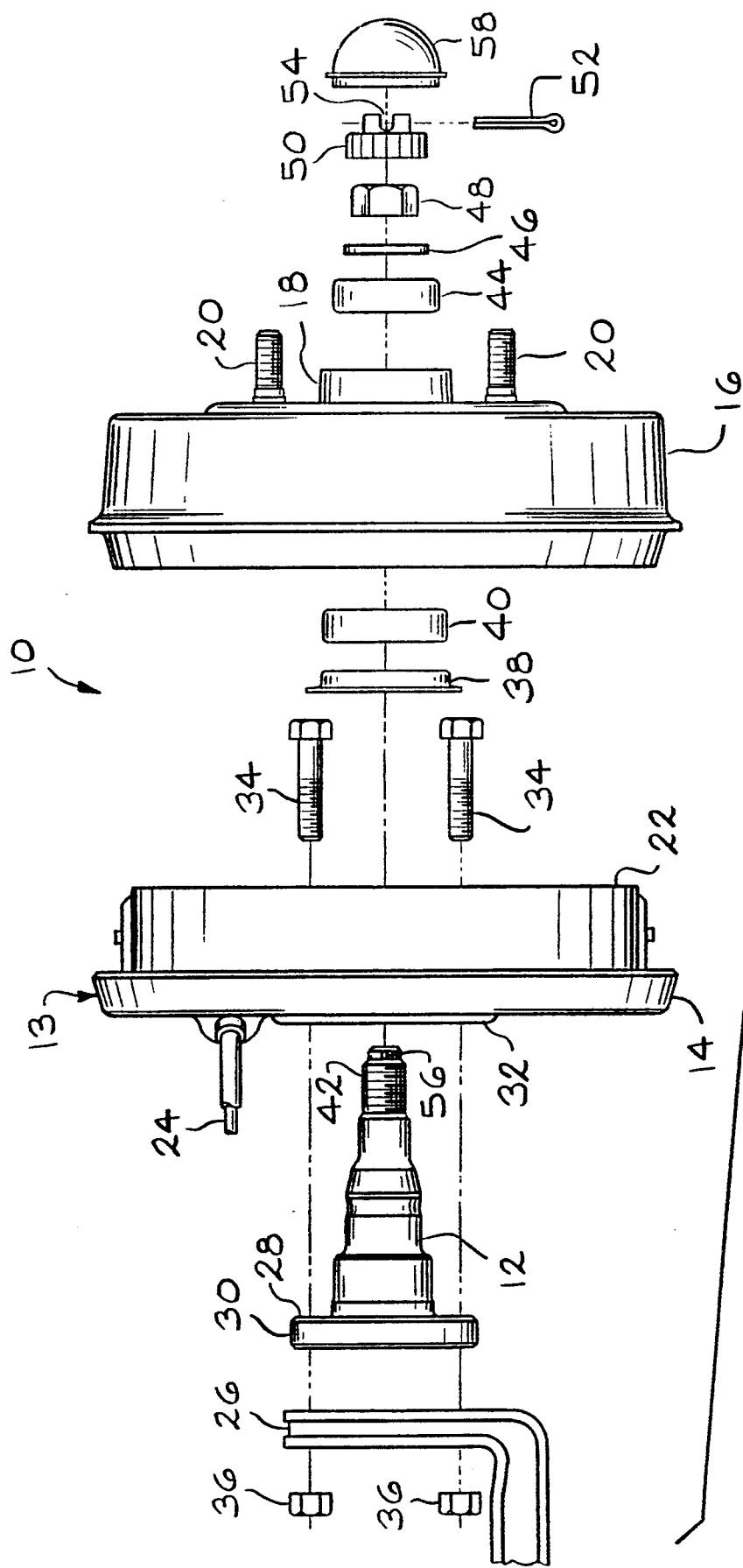
FIG. 1 is an exploded view illustrating a prior art brake assembly.
Figure 4:
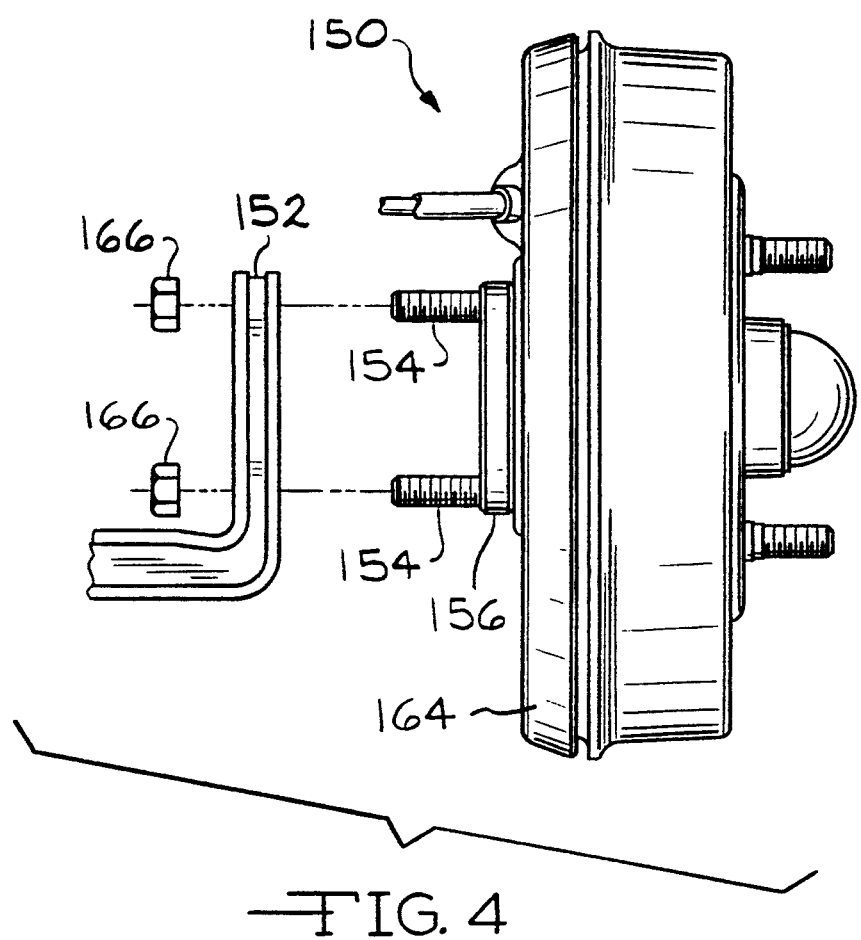
FIG. 4 is an exploded view illustrating a first embodiment of a brake assembly constructed in accordance with the present invention.

Turning now to FIG. 4, there is illustrated a drum brake assembly, indicated generally at 150, and constructed in accordance with the present invention. As shown in FIG. 4, the drum brake assembly 150 is similar to the drum brake assembly 10 shown in prior art FIG. 1, except that the brake assembly 150 is a completely preassembled vehicle spindle and brake assembly which is ready to be installed and secured to an axle flange 152 of a vehicle.

Figure 5:
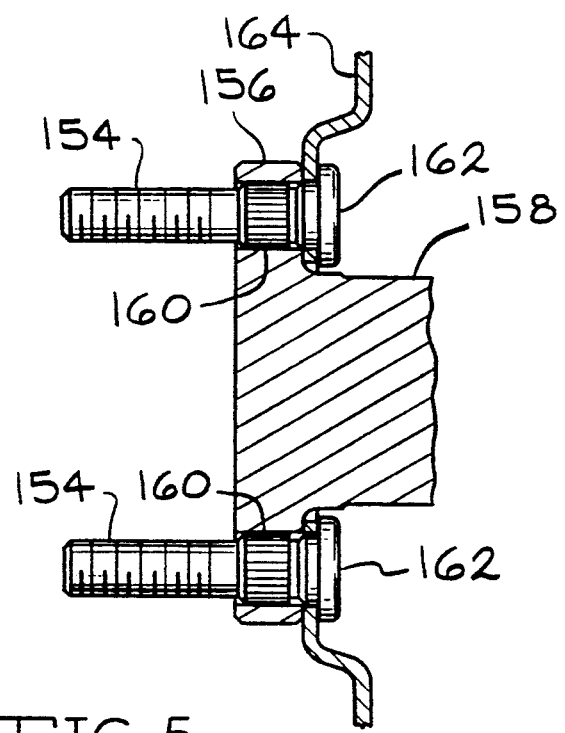
FIG. 5 is a partial sectional view of a portion of FIG. 4.

In order to provide the preassembled brake assembly 150 shown in FIG. 4, the brake assembly 150 includes a plurality of vehicle mounting lugs 154 which are press-fit into apertures formed in a flange 156 of spindle 158, best shown in FIG. 5. As shown therein, each lug 154 includes a ribbed or serrated neck 160 and a generally round flat head 162. When the lugs 154 are installed through corresponding apertures formed in a backing plate 164 and the spindle flange 156, the serrations 160 frictionally secure the lugs 154 within the spindle flange 156, and also to secure the backing plate 164 to the spindle 158.

As a result of the lugs 154 being secured within the spindle flange 156 and also securing the backing plate 164 to the spindle 158, the remaining brake components can be assembled to produce the preassembled brake assembly 150. Later, the preassembled brake assembly 150 can be secured to the axle flange 152 by inserting the lugs 154 through corresponding apertures formed in the axle flange 152 and installing lug nuts 166 thereon. In the prior art drum brake assembly 10 shown in FIG. 1, the brake subassembly 13 and the spindle 12 had to be initially bolted to the axle flange 26 before the remaining brake components could be assembled to complete the brake assembly.

Figure 2:
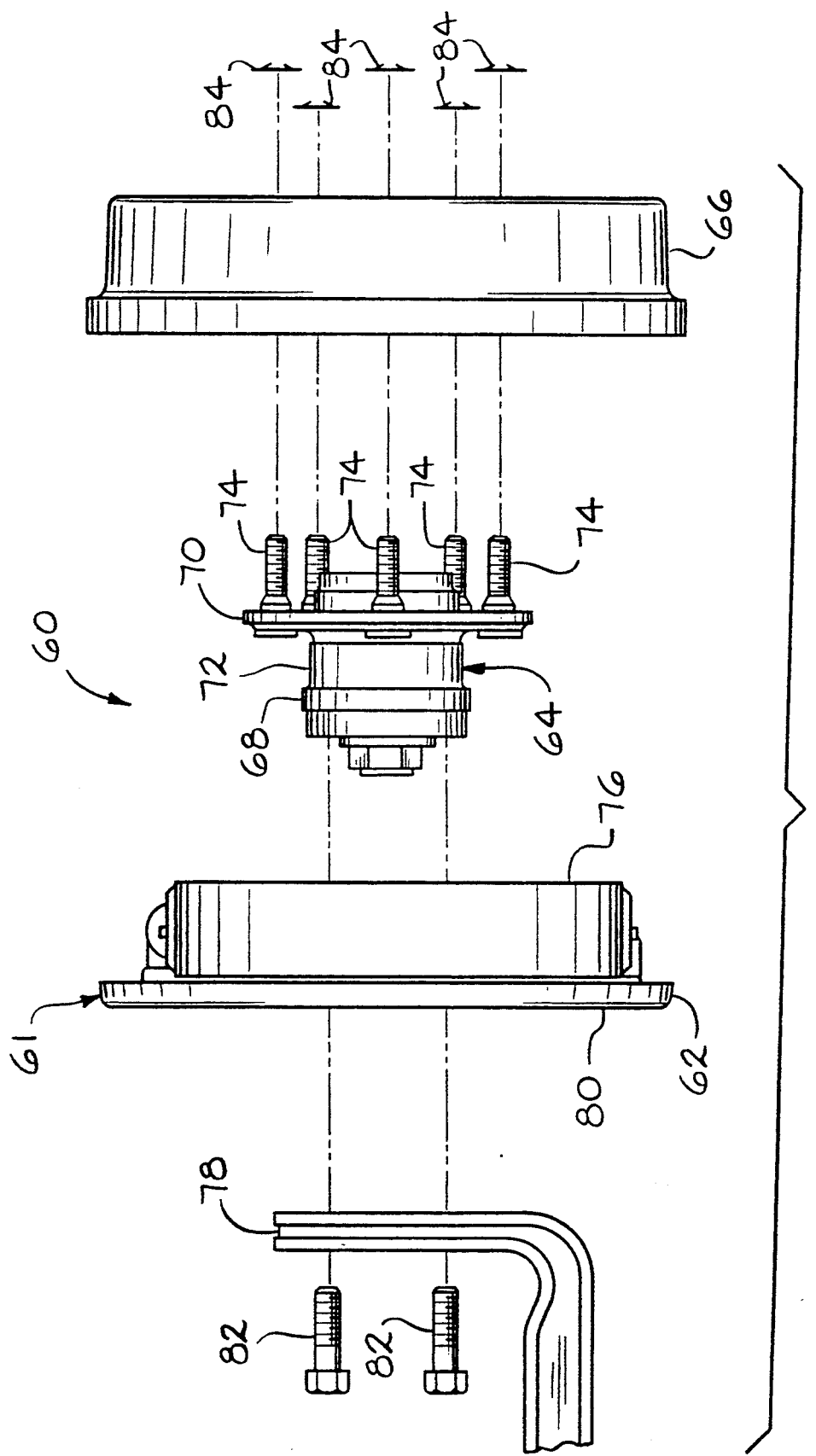
FIG. 2 is an exploded view illustrating another prior art brake assembly.
Figure 6:
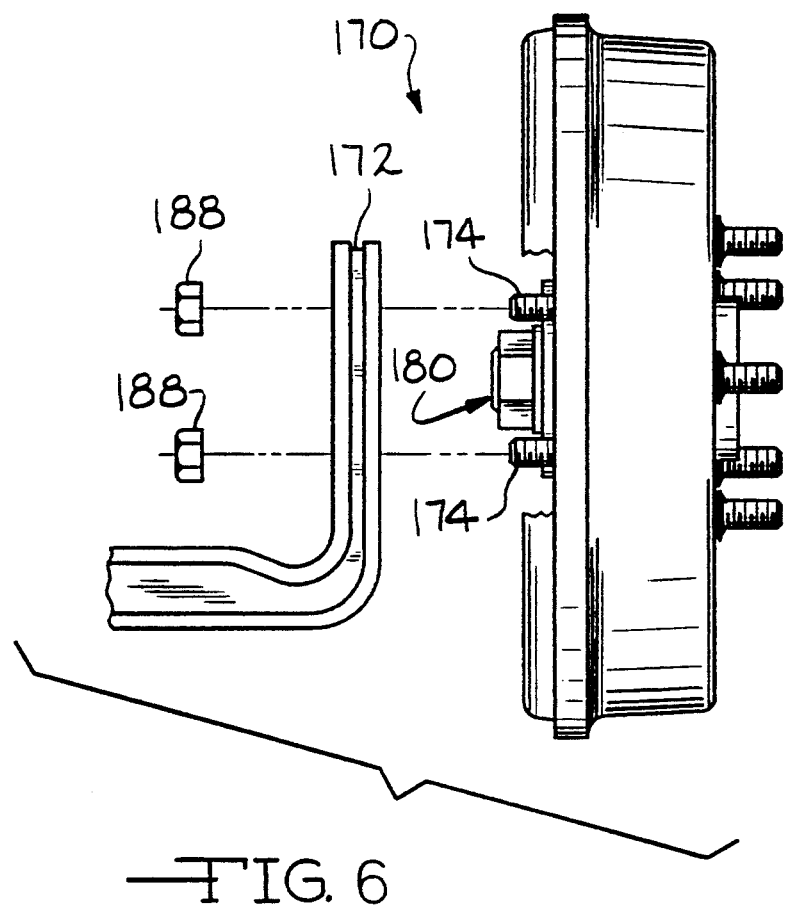
FIG. 6 is an exploded view illustrating a second embodiment of a brake assembly constructed in accordance with the present invention.

FIG. 6 illustrates another version of a drum brake assembly, indicated generally at 170, and constructed in accordance with the present invention. As shown in FIG. 6, the drum brake assembly 170 is similar to the drum brake assembly 60 shown in prior art FIG. 2, except that the brake assembly 170 is a completely preassembled vehicle spindle and brake assembly which is ready to be installed and secured to an axle flange 172 of a vehicle.

Figure 7:
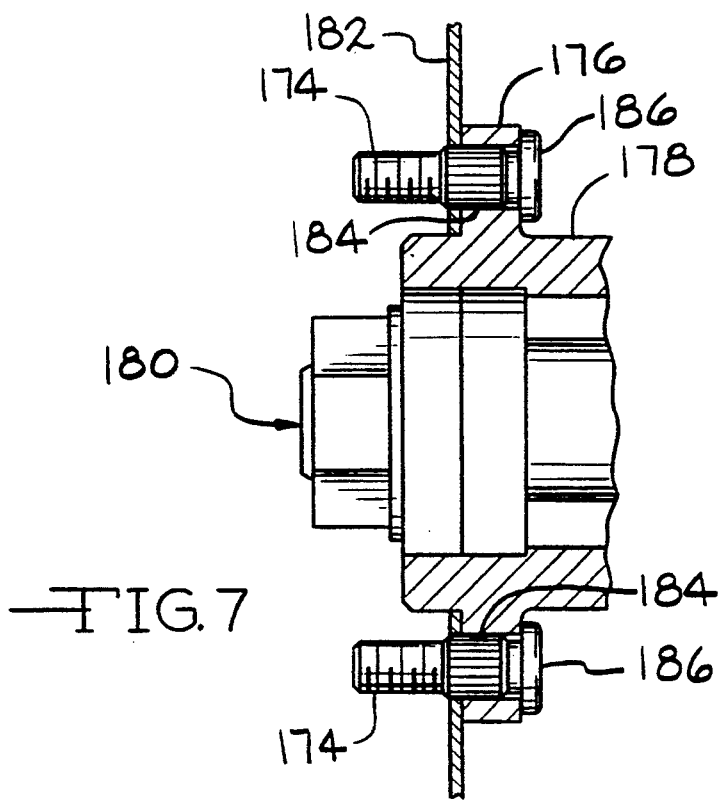
FIG. 7 is a partial sectional view of a portion of FIG. 6.

In order to provide the preassembled brake assembly 170 shown in FIG. 6, the brake assembly 170 includes a plurality of vehicle mounting lugs 174 which are press-fit into apertures formed in a flange 176 of a spindle 178 of a hub and bearing unit 180, and in a backing plate 182, best shown in FIG. 7. As shown therein, each lug 174 includes a ribbed or serrated neck 184 and a generally round flat head 186. When the lugs 174 are installed through the apertures of the spindle flange 176 and the backing plate 182, the serrations 184 frictionally secure the lugs 174 therein, and also secure the backing plate 182 to the spindle flange 176 of the hub and bearing unit 180.

As a result of the lugs 174 being secured within the spindle flange 176 and the backing plate 182, and also securing the backing plate 182 to the spindle flange 178 of the hub and bearing unit 180, the remaining brake components can be assembled to produce the preassembled brake assembly 170. Later, the preassembled brake assembly 170 can be secured to the axle flange 172 by inserting the lugs 174 through corresponding apertures formed in the axle flange 172 and installing lug nuts 188 thereon. In the prior art drum brake assembly 60 shown in FIG. 2, the brake subassembly 61 and the hub and bearing unit 64 had to be initially bolted to the axle flange 78 before the remaining brake components could be assembled to complete the brake assembly.

Figure 3:
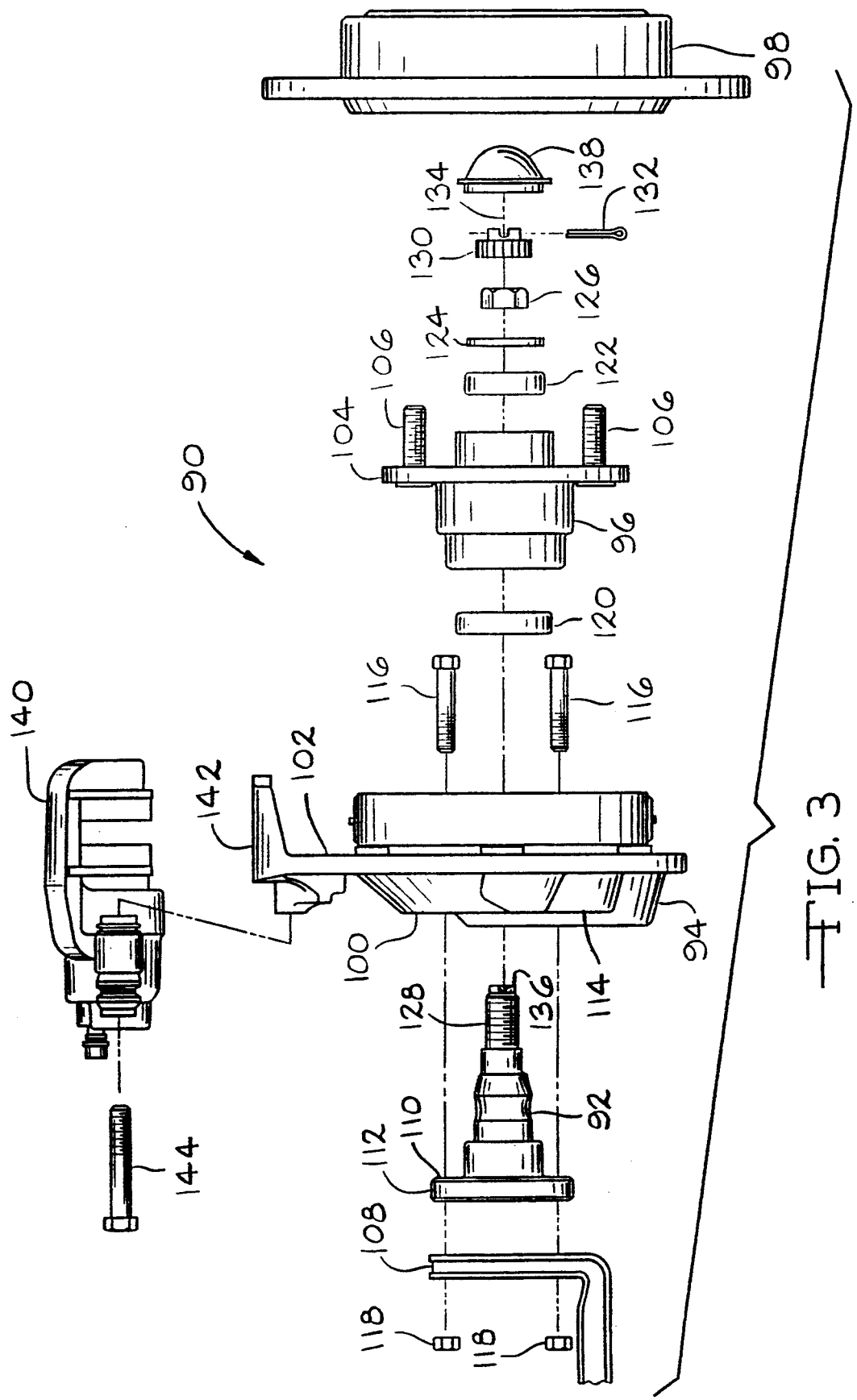
FIG. 3 is an exploded view illustrating yet another prior art brake assembly.
Figure 8:
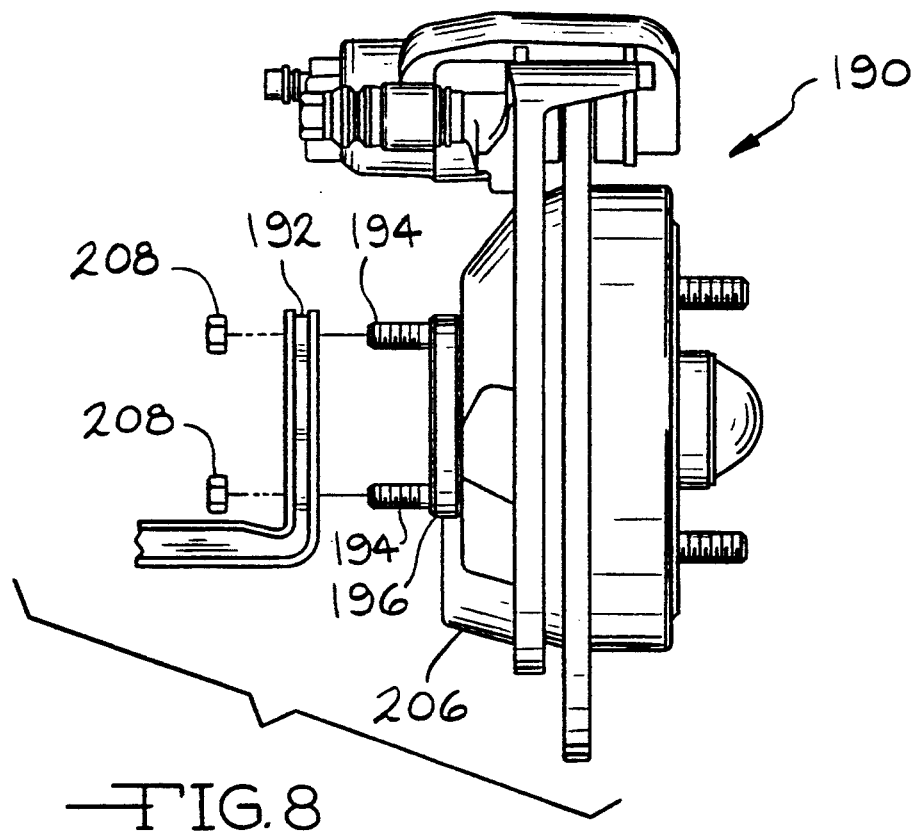
FIG. 8 is an exploded view illustrating a third embodiment of a brake assembly constructed in accordance with the present invention.

FIG. 8 illustrates yet another version of a brake assembly, indicated generally at 190, and constructed in accordance with the present invention. As shown in FIG. 8, the brake assembly 190 is a disc brake assembly having a drum-in-hat parking brake and is similar to the brake assembly 90 shown in prior art FIG. 3, except that the brake assembly 190 is a completely preassembled vehicle spindle and brake assembly which is ready to be installed and secured to an axle flange 192 of a vehicle.

Figure 9:
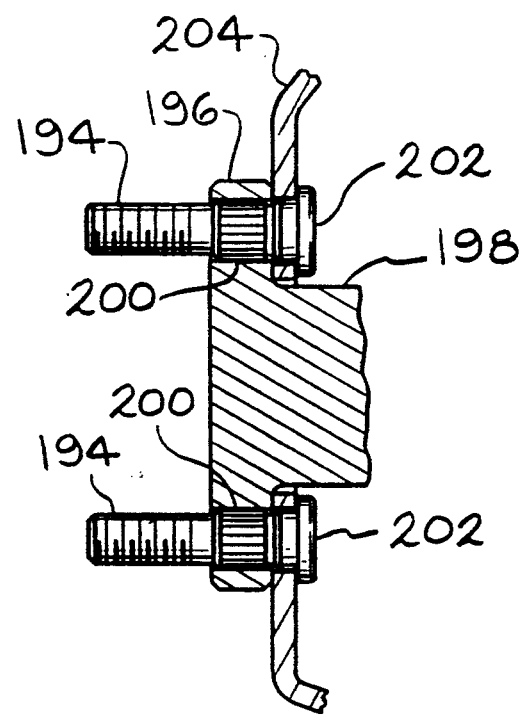
FIG. 9 is a partial sectional view of a portion of FIG. 8.

In order to provide the preassembled spindle and brake assembly 190 shown in FIG. 8, the brake assembly 190 includes a plurality of vehicle mounting lugs 194 which are press-fit into apertures formed in a flange 196 of spindle 198, best shown in FIG. 9. Each lug 194 includes a ribbed or serrated neck 200 and a generally round flat head 202. When the lugs 194 are installed through apertures formed in a wheel mounting flange 204 of a brake support casting 206 and the spindle flange 196, the serrations 200 frictionally secure the lugs 194 therein, and also to secure the mounting flange 204, and therefore the brake support casting 206, to the spindle 198.

As a result of the lugs 194 being secured within the spindle flange 196 and also securing the brake support casting 206 to the spindle 198, the remaining brake components can be assembled to produce the pre-assembled brake assembly 190. Later, the preassembled brake assembly 190 can be secured to the axle flange 192 by inserting the lugs 194 through corresponding apertures formed in the axle flange 192 and installing lug nuts 208 thereon. In the prior art brake assembly 90 shown in FIG. 3, the brake support casting 94 and the spindle 92 had to be initially bolted to the axle flange 108 before the remaining brake components could be assembled to complete the brake assembly.

One advantage of the present invention is that the preassembled vehicle spindle and brake assembly can be installed on a vehicle simply by inserting the vehicle mounting lugs through corresponding apertures formed in the axle flange and installing the lug nuts thereon. Thus, at the place of installation of the preassembled brake assembly on the vehicle, less time is required to install the preassembled brake assembly of the present invention compared to the amount of time required to both assemble and install the prior art brake assembly on a vehicle, wherein the individual brake components can be installed only after securing the spindle and the brake subassembly or the support casting to the vehicle axle flange.

In addition, the preassembled brake assembly of the present invention requires installation of only one fully assembled brake unit on the vehicle compared to the prior art method wherein a plurality of brake parts need to be installed on the vehicle to produce the finish brake assembly. As a result of this, the possibility of incorrect assembly and installation of the brake assembly of the present invention on the vehicle is minimized. Also, since the brake assembly of the present invention is completely preassembled and shipped to the assembly plant ready to be installed on a vehicle, less inventory space is needed, and assembly line down time due to a shortage of one or more individual brake components will no longer occur.

While this invention has been described and illustrated as providing a completely preassembled vehicle spindle and brake assembly as shown in FIGS. 6 and 8, in some instances, certain brake components can be assembled after the brake assembly is secured to the vehicle axle. For example, in FIG. 6, the preassembled brake assembly does not have to include the drum as part of the preassembled brake assembly. In FIG. 8, the preassembled brake assembly does not have include the rotor and caliper as part of the preassembled brake assembly. Also, in FIG. 8, the rotor can include an integrally formed hub, and the backing plate and the mounting flange can be separate components and secured to one another.

While not shown in the drawings, the preassembled spindle and brake assembly can include a wheel speed sensor having a cable connected thereto and extending from the brake assembly, and an exciter ring secured relative to the drum or rotor.

In addition, while the preassembled vehicle spindle and brake assembly has been shown and described as being attached to an axle flange of the vehicle, the preassembled brake assembly can be attached to other vehicle components. For instance, in a vehicle having independent suspension of the rear wheels, the preassembled brake assembly can be attached to an associated rear suspension component, such as for example, a knuckle for supporting a shock absorber, which in turn is secured to the vehicle. Also, while FIGS. 8 and 9 illustrate and describe the preassembled brake assembly as being a disc brake assembly having a drum-in-hat parking brake, the preassembled brake assembly can be of a disc brake assembly not including a drum-in-hat parking brake.

In accordance with the provisions of the patent statutes, the principle and mode of operation of this invention have been described and illustrated in its preferred embodiment. However, it must be understood that the invention may be practiced otherwise than as specifically explained and illustrated without departing from its spirit or scope.

What is claimed:

1. A method of installing a vehicle spindle and brake assembly on a vehicle component comprising the steps of:
   (a) providing a spindle and brake assembly including a spindle, bearing means carried by said spindle, a rotatable component supported relative to said spindle by said bearing means, a plurality of vehicle mounting lugs adapted to extend through a plurality of lug receiving apertures formed in a vehicle component and be secured thereto by a plurality of lug nuts, a plurality of wheel mounting lugs carried by said rotatable component, and means carried by said spindle for securing said plurality of vehicle mounting lugs to said spindle to maintain said vehicle mounting lugs in a predetermined orientation such that said spindle and brake assembly can be installed on the vehicle component;
   (b) subsequent to step (a), positioning the spindle and brake assembly on the vehicle component such that said vehicle mounting lugs extend through said plurality of lug receiving apertures formed in the vehicle component; and
   (c) securing the spindle and brake assembly to the vehicle component.

2. The method defined in claim 1 wherein the spindle and brake assembly of step (a) includes brake friction pads supported relative to said spindle, and said rotatable component includes an annular surface engageable by the brake friction pads.

3. A vehicle spindle and brake assembly comprising:
   a spindle;
   bearing means carried by said spindle;
   brake friction pads supported relative to said spindle;
   a rotatable brake component supported relative to said spindle by said bearing means and having an annular surface engageable by said brake friction pads;
   a plurality of wheel mounting lugs carried by said rotatable component;
   a plurality of vehicle mounting lugs adapted to extend through a plurality of lug receiving apertures formed in a vehicle component and be secured thereto by a plurality of lug nuts; and
   means carried by said spindle for securing said plurality of vehicle mounting lugs to said spindle to maintain said vehicle mounting lugs in a predetermined orientation such that said spindle and brake assembly can be installed on the vehicle component.

* * * * *